United States Patent
Ono et al.

(10) Patent No.: US 8,223,287 B2
(45) Date of Patent: Jul. 17, 2012

(54) ELECTROOPTIC DEVICE AND ELECTRONIC DEVICE

(75) Inventors: Takehiro Ono, Fujimi-machi (JP); Shuhei Yamada, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1115 days.

(21) Appl. No.: 11/854,268

(22) Filed: Sep. 12, 2007

(65) Prior Publication Data

US 2008/0158118 A1  Jul. 3, 2008

(30) Foreign Application Priority Data

Oct. 11, 2006  (JP) .................................. 2006-277235
Oct. 19, 2006  (JP) .................................. 2006-284689

(51) Int. Cl.
*G02F 1/136* (2006.01)
(52) U.S. Cl. ................. 349/43; 349/42; 349/47; 345/87
(58) Field of Classification Search .................... 349/43, 349/42, 77; 345/87
See application file for complete search history.

(56) References Cited

U.S. PATENT DOCUMENTS

| | | | |
|---|---|---|---|
| 6,597,424 B2 | 7/2003 | Hattori et al. | |
| 6,633,360 B2 | 10/2003 | Okada et al. | |
| 6,671,009 B1 | 12/2003 | Hattori et al. | |
| 6,836,302 B2 * | 12/2004 | Sato ................................ | 349/46 |
| 6,950,172 B2 | 9/2005 | Hattori et al. | |
| 6,956,633 B2 | 10/2005 | Okada et al. | |
| 7,142,259 B2 * | 11/2006 | Hattori et al. .................. | 349/33 |
| 7,292,860 B2 * | 11/2007 | Tobe et al. .................... | 455/446 |
| 7,884,364 B2 * | 2/2011 | Kim et al. ....................... | 257/59 |
| 2001/0015778 A1 * | 8/2001 | Murade et al. ................. | 349/43 |
| 2002/0063835 A1 * | 5/2002 | Kim ............................... | 349/141 |
| 2004/0169777 A1 | 9/2004 | Tanaka et al. | |

FOREIGN PATENT DOCUMENTS

| | | |
|---|---|---|
| JP | A-7-199215 | 8/1995 |
| JP | A 9-61855 | 3/1997 |
| JP | A-11-174453 | 7/1999 |
| JP | A-11-212053 | 8/1999 |
| JP | A-2001-83479 | 3/2001 |
| JP | A-2001-166321 | 6/2001 |
| JP | A-2001-222026 | 8/2001 |
| JP | A-2001-281682 | 10/2001 |
| JP | A-2003-75867 | 3/2003 |
| JP | 2003-280036 | * 10/2003 |
| JP | A-2003-280036 | 10/2003 |

* cited by examiner

*Primary Examiner* — Edward Glick
*Assistant Examiner* — Sang Nguyen
(74) *Attorney, Agent, or Firm* — Oliff & Berridge, PLC

(57) ABSTRACT

An electrooptic device includes two adjacent pixel electrodes. A potential that is different from the potential of the first and second pixel electrodes is applied to an area between the adjacent pixel electrodes.

7 Claims, 12 Drawing Sheets

ELECTROOPTIC DEVICE AND ELECTRONIC DEVICE

BACKGROUND

1. Technical Field

The present invention relates to the technical field of an electrooptic device such as a liquid crystal device and an electronic device having the electrooptic device.

2. Related Art

Liquid crystal devices, one example of electrooptic devices of this type, display images in such a manner that the orientation of the liquid crystal molecules between a pixel electrode and an counter electrode disposed on a pair of liquid-crystal holding substrates, respectively, by application of a predetermined voltage therebetween.

Electrooptic devices of this type may have the technical problem of causing defective orientation of the liquid crystal molecules due to a transverse electric field (an electric field parallel to the substrate surface or an oblique electric field containing a component parallel to the substrate surface) which is generated between adjacent pixel electrodes on the substrate according to the difference in potential between the pixel electrodes. When such a transverse electric field is applied to an electrooptic substance such as liquid crystal, to which a vertical electric field between the pixel electrode and the counter electrode facing each other is to be applied, abnormal operation of the electrooptic device, such as defective orientation of the liquid crystal, occurs, causing the problem of light leakage at that part to decrease the contrast.

An example of means for solving such a problem is a liquid crystal display disclosed in JP-A-9-61855, which has a source line extending in parallel with the orientation of the liquid crystal molecules to reduce the transverse electric field in the domain in which defective orientation is caused. There is also a method of improving the response of the liquid crystal when displaying moving images to make it hard to see defective orientation.

This type of electrooptic device can cause afterimages and tailing (a phenomenon in which the image of a moving object persists to have a tail and thus gets blurred, and thus a smooth moving image cannot be displayed) by the influence of the transverse electric field. More specifically, when the electrooptic devices are driven, display problems such as afterimages may be caused by the reverse tilt of the liquid crystal generated by the unbalance of the orientation of the vertical electric field generated between the counter electrode and two pixel electrodes corresponding to the counter electrode and the orientation of the transverse electric field caused by the potential difference between the two pixel electrodes and the generation of an area in which the liquid crystal is oriented in undesired directions in the pixels. This leads to an increasing need for the technique of decreasing reverse tilt by reducing the transverse electric field so as to display high-definition images.

Another request for this type of electrooptic device is to improve the contrast, that is, to prevent a decrease in contrast caused by devising the planer shape of the pixel electrodes to reduce afterimages and tailing as much as possible.

SUMMARY

An advantage of some aspects of the invention is to provide an electrooptic device such as a liquid crystal device in which problems for display, such as afterimages and tailing, during displaying moving images, can be reduced, while a decrease in contrast is prevented, and an electronic device such as a projector equipped with the electrooptic device.

In electrooptic device according to a first aspect of the invention includes a first substrate and a second substrate; an electrooptic material sandwiched between the first and second substrates; and a first pixel electrode and a second pixel located between the electrooptic material and the first substrate, the first and second pixel electrodes being supplied with different potentials, the first pixel electrode and the second pixel being located next to each other as viewed from the direction normal to the surface of the first substrate, the first pixel electrode having a first edge and the second pixel electrode having a second edge, the first edge and the second edge facing each other and separated bad an interval, at least a part of the first edge of the first pixel electrode having a recess, at least a part of the second edge of the second pixel electrode having a protrusion, the protrusion protruding from the second edge into a region defined by the recess.

In this mode, there is an electrooptic material such as liquid crystal between the pair of substrates. The first pixel electrode and the second pixel electrode are disposed on the first substrate in such a manner as to be next to each other at an interval as viewed from the direction along the normal of the surface of the first substrate, and different potentials are applied to the first and second substrates when the electrooptic device is driven.

Here, "different potentials are applied" is not limited to a case in which different potentials are applied from a driving circuit to the first pixel electrode and the second pixel electrode according to an image signal but includes a case in which different potentials are applied to the first pixel electrode and the second pixel electrode because of the difference in the resistance of the wires for applying potentials to the first pixel electrode and the second pixel electrode.

The first pixel electrode and the second pixel electrode are two adjacent pixel electrodes of a plurality of pixel electrodes arrayed in matrix form on the first substrate, which is a TFT array substrate on which semiconductor elements such as TFTs, data lines, and scanning lines are formed. The first substrate may have a multilayer structure including transparent substrate made of glass or quartz and an insulating layer thereon.

In this mode, the transverse electric field generated between the first pixel electrode and the second pixel electrode according to the potential difference therebetween is reduced owing to the planar shape of the pixel electrodes according to an embodiment of the invention, to be described below. More specifically, this structure reduces the transverse electric field generated between the first edge of the first pixel electrode and the second edge of the edges of the second pixel electrode which faces the first edge with a space therebetween.

In this mode, the first pixel electrode has a recess at least at part of the first edge of the first pixel electrode facing the second pixel electrode; and the second pixel electrode has a protrusion at least at part of the second edge of the second pixel electrode facing the first pixel electrode, the protrusion protruding from the second edge so as to overlap with a region defined by the recess. This allows the transverse electric field generated between the first edge and the second edge to be reduced at least partly. More specifically, the presence of the recess and the protrusion can weaken the transverse electric field in such a manner as to partially cut it in the direction in which the first edge and the second edge extend, thus making the intensity distribution of the electric field generated between the first and second edges nonuniform. This nonuniform electric field intensity can reduce the transverse electric field generated between the first pixel electrode and the second pixel electrode adjacent to each other, as compared with a case in which the first edge and the second edge extend in parallel.

The recess and the protrusion may be either the same or different in plan view. The recess and the protrusion may be different in sizes and shapes, as long as the protrusion overlaps with the region defined by the recess.

In this mode, the first edge and the second edge may have a recess and a protrusion at least at part so as to make the electric-field intensity distribution between the first and second pixel electrodes nonuniform. This structure can restrict a decrease in open air ratio so that the contrast of images is not influenced.

Thus, with this electrooptic device, the transverse electric field can be reduced while a decrease in open air ratio is prevented. Therefore, display troubles such as afterimages or tailing due to a transverse electric field can be reduced while a drop in contrast due to a decrease in open air ratio is suppressed.

In another mode, the recess and the protrusion may be the same in plan view.

This structure facilitates patterning the first pixel electrode and the second pixel elect rode as compared with a case in which the recess and the protrusion are formed different in plan view. This also facilitates setting the interval between the recess and the protrusion. That is, the first pixel electrode and the second pixel electrode can be formed as large as possible while the recess and the protrusion are not in contact.

In another mode, the electrooptic device may further include a counter electrode formed on the second substrate and facing the first pixel electrode and the second pixel electrode. The different potentials may have different polarities with reference to a common potential applied to the counter electrode.

With this structure, the transverse electric field can be reduced and afterimages and tailing can be reduced even by inversion driving in which the polarities of the potentials applied to the pixel electrodes are inverted with respect to the reference potential of the counter electrode according to a predetermined rule. Examples of the inversion driving are 1H inversion driving, 1S inversion driving, and dot inversion. The 1H inversion driving is a method in which during display corresponding to the image signal of a first frame or filed, pixel electrodes in odd-numbered rows are driven by a positive potential with respect to a specified reference potential, while pixel electrodes in even-numbered rows are driven by a negative potential with respect to the specified reference potential; in contrast, during display corresponding to the image signal of the following frame or fields pixel electrodes in even-numbered rows are driven by a positive potential, while pixel electrodes in odd-numbered rows are by a negative potential (that is, pixel electrodes in the same row are driven by a potential of the same polarity, and the polarity is inverted every frame or field). The 1S inversion driving is a method in which the polarity is inverted every column). The dot inversion is a method in which the polarity is inverted every pixel. This structure can reduce occurrence of afterimages and tailing even if moving images are displayed by such inversion driving.

An electrooptic device according to a second aspect of the invention includes a first substrate and a second substrate; an electrooptic material sandwiched between the first and second substrates; a first pixel electrode and a second pixel electrode located between the electrooptic material and the first substrate, the first pixel electrode and the second pixel being located next to each other as viewed from the direction normal to the surface of the first substrate and being separated by a region extending between the first pixel electrode and the second pixel electrode, the first and second pixel electrodes beings supplied with different potentials; and a conducting layer formed in island shapes that are isolated from each other, at least one of the island shapes overlapping the region extending between the first pixel electrode and the second pixel electrode, the conducting layer being supplied with a first potential different from the potentials supplied to the first pixel electrode and the second pixel electrode.

In this mode, there is an electrooptic material such as liquid crystal between the pair of substrates. The first pixel electrode and the second pixel electrode are disposed next to each other at an interval on the first substrate. More specifically, the first pixel electrode and the second pixel electrode are two adjacent pixel electrodes of a plurality of pixel electrodes arrayed in matrix form on the first substrate, which is a TFT array substrate on which semiconductor elements such as TFTs, data lines, and scanning lines are formed. The first substrate which is a TFT array substrate may have a multilayer structure including transparent substrate made of glass or quartz and an insulating layer thereon.

The conducting layer is formed in islands so as to overlap with the region extending between the first pixel electrode and the second pixel electrode. When the electrooptic device is driven, the conducting layer is provided with a first potential different from the respective potentials of the first pixel electrode and the second pixel electrode. The "region extending between the first pixel electrode and the second pixel electrode" is a region in which semiconductor devices such as pixel-switching TFTs for driving the first pixel electrode and the second pixel electrode and various wires are provided; for example, it is an unopen area of the pixels through which no light passes substantially. The conducting layer is shaped in islands in such unopen area. Since the conducting layer is supplied with the first potential different from the potentials of the first pixel electrode and the second pixel electrode, the transverse electric field generated between the pixel electrodes according to the difference in potential between the first pixel electrode and the second pixel electrode can be reduced. More specifically, the conducting layer can weaken the transverse electric field along the substrate surface generated between the pixel electrodes in such a manner as to partially cut it.

The conducting layer may overlap with the region extending between the first pixel electrode and the second pixel electrode. The conducting layer may be formed either in the same layer as the first pixel electrode and the second pixel electrode or in a layer different from the pixel electrodes. The conductive layer may be partially overlapped with the first pixel electrode and the second pixel electrode in such a manner as not to decrease the open air ratio of the pixels. In addition, the planar shape of the conducting layer is not necessarily be the shape illustrated in the following embodiments (rectangular) but may be circular, polygonal, or irregular.

In this mode, the conductive layer is formed in the region extending between the first pixel electrode and the second pixel electrode, that is, the region of pixels which does not contribute to displaying images. This structure can reduce a decrease in open air ratio so as not to substantially exert an influence on the contrast of the images.

With this structure, the transverse electric field can be reduced while a decrease in open air ratio is prevented. Accordingly, troubles in display such as afterimages or tailing due to the transverse electric field can be reduced while a decrease in contrast due to the decrease in open air ratio is reduced.

The first pixel electrode and the second pixel electrode are supplied with different potentials corresponding to the driving of the pixel electrodes. The potentials are not limited to a case in which different potentials are applied to the first pixel electrode and the second pixel electrode according to image signals from a driving circuit but includes a case in which different potentials are applied to the first pixel electrode and the second pixel electrode because of the difference in the resistance of the wires for applying potentials to the first pixel electrode and the second pixel electrode.

In another mode, the electrooptic device may further include a counter electrode formed on the second substrate and facing the first pixel electrode and the second pixel electrode. The first potential may be different from a common potential applied to the counter electrode.

With this structure, when the electrooptic device is driven, a vertical electric field is generated between the counter electrode and the conductive layer in the direction intersecting the transverse electric field generated between the first pixel electrode and the second pixel electrode, that is, in the direction perpendicular to the surface of the first substrate. Such vertical electric field can make the intensity distribution of the transverse electric field nonuniform in such a manner as to partially cut the transverse electric field generated between the first pixel electrode and the second pixel electrode. Thus, the transverse electric field generated between the first pixel electrode and the second pixel electrode can be reduced.

In this mode, the respective potentials of the first pixel electrode and the second pixel electrode may have different polarities with reference to the common potential.

With this structure, the transverse electric field can be reduced and afterimages and tailing can be reduced even by inversion driving in which the polarities of the potentials applied to the pixel electrodes are inverted with respect to the reference potential of the counter electrode according to a predetermined rule. Examples of the inversion driving are 1H inversion driving, 1S inversion driving, and dot inversion. The 1H inversion driving is a method in which during display corresponding to the image signal of a first frame or filed, pixel electrodes in odd-numbered rows are driven by a positive potential with respect to a specified reference potential, while pixel electrodes in even-numbered rows are driven by a negative potential with respect to the specified reference potential; in contrast, during display corresponding to the image signal of the following frame or field, pixel electrodes in even-numbered rows are driven by a positive potential, while pixel electrodes in odd-numbered rows are by a negative potential (that is, pixel electrodes in the same row are driven by a potential of the same polarity, and the polarity is inverted every frame or field). The 1S inversion driving is a method in which the polarity is inverted every column). The dot inversion is a method in which the polarity is inverted every pixel. This structure can reduce occurrence of afterimages and tailing even if moving images are displayed by such inversion driving.

In another mode, the conducting layer may be formed on the first substrate and on the same layer as the first pixel electrode and the second pixel electrode.

In this mode, after the layer common to the first pixel electrode and the second pixel electrode has been formed, the pixel electrodes and the conducting layer can be patterned in a predetermined planer shape. This facilitates the process of manufacturing the electrooptic device as compared with a case in which the conductive layer is formed by a process different from the process of forming the pixel electrodes. In addition, this can reduce the distance between the counter electrode and the conductive layer as compared with a case in which the conductive layer is formed under the first pixel electrode and the second pixel electrode, thus increasing the vertical electric field generated between the counter electrode and the conductive layer to increase the effect of reducing the transverse electric field.

In another mode, the first pixel electrode and the second pixel electrode may be formed on the same layer in such a manner as to increase in the interval therebetween so that the width of part of the region is increased.

In this mode, the space for the conductive layer can be ensured even if the interval between the first pixel electrode and the second pixel electrode is narrow.

In another mode, the electrooptic device may further include an image signal line formed on the first substrate and under the first pixel electrode and the second pixel electrode, for feeding image signals to the first pixel electrode and the second pixel electrode; and a connecting portion that electrically connects the image signal line and the conducting layer.

In this mode, the potential of the image signal line can be applied to the conductive layer. Therefore, the orientation of the electrooptic material such as liquid crystal placed between the conductive layer and the counter electrode can be controlled to the same state as during driving. This electrooptic material prevents the disturbance of orientation generated in the electrooptic material located on the first pixel electrode and the second pixel electrode from connecting continuously between the pixel electrodes. Thus, display troubles such as tailing that may occur when moving images are displayed can be reduced effectively.

An electronic device according to a third aspect invention includes the above-described electrooptic device.

Examples of the electronic device incorporating the electrooptic device according to the first and second aspects of the invention are projection displays, portable phones, electronic notebooks, word processors, viewfinder or monitor-direct-view type videotape recorders, work stations, TV phones, POS terminals, and touch panels capable of high-definition display. Another example of the electronic device includes electrophoresis apparatus such as electronic paper

BRIEF DESCRIPTION OF THE DRAWINGS

The invention will be described with reference to the accompanying drawings, wherein like numbers reference like elements.

DESCRIPTION OF EXEMPLARY EMBODIMENTS

The above and other operations and advantages of the present invention will be apparent from the following detailed description of the preferred embodiments.

An electrooptic device and an electronic device according to embodiments of the invention will be described with reference to the drawings.

First Embodiment

1. Electrooptic Device
1-1. Overall Structure of Electrooptic Device

Figure 1:
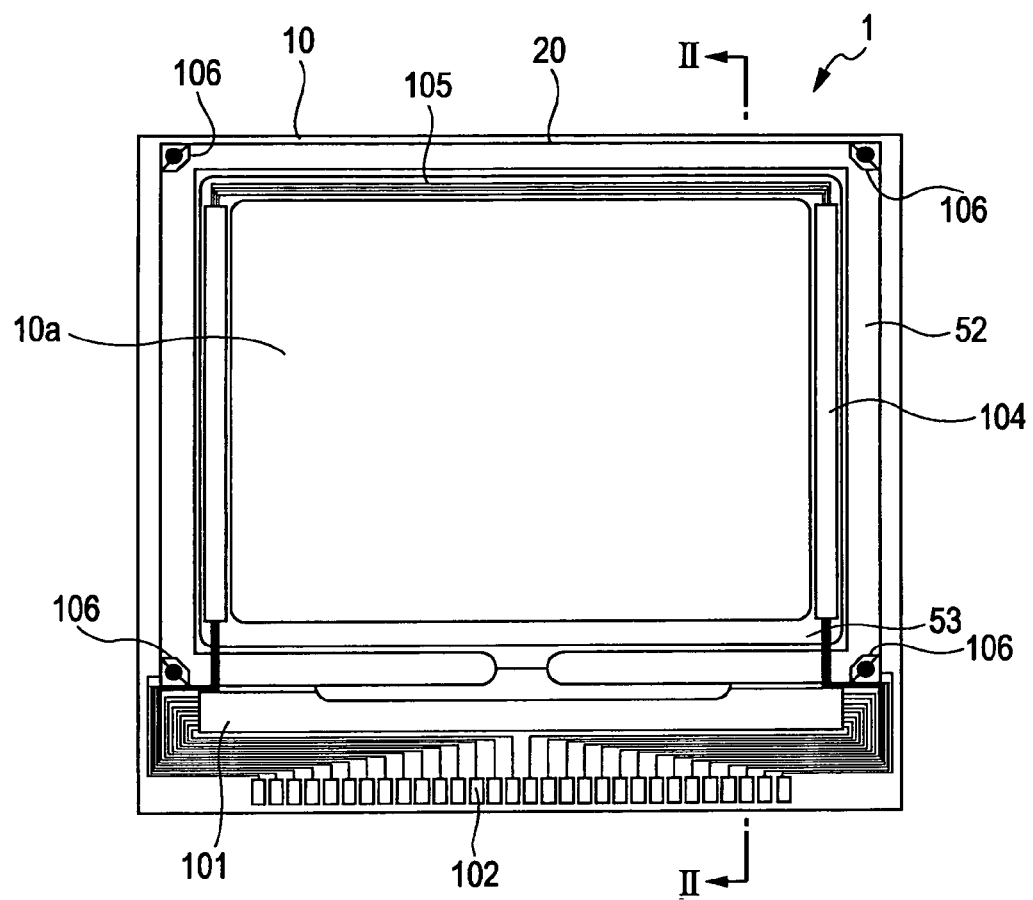
FIG. 1 is a plan view of an electrooptic device according to a first embodiment of the invention.
Figure 2:
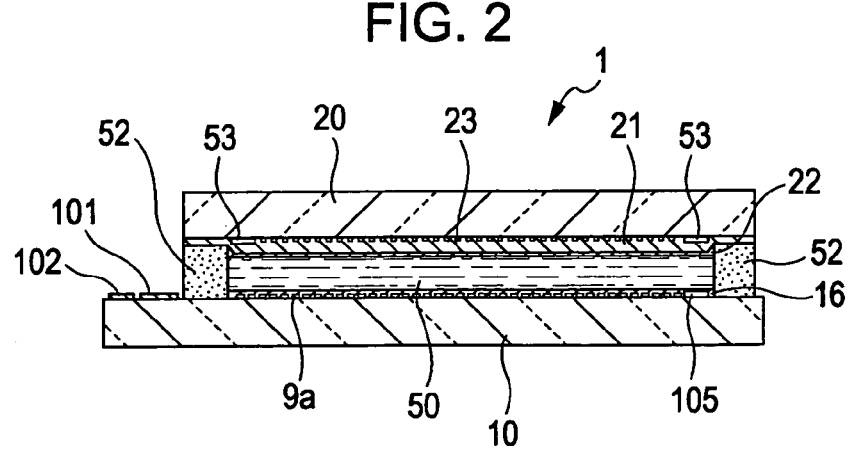
FIG. 2 is a cross-sectional view taken along line II-II of FIG. 1.

Referring first to FIGS. 1 and 2, an electrooptic device according to a first embodiment will be described. FIG. 1 is a plan view of the electrooptic device including a TFT array substrate and components formed thereon, as viewed from a counter substrate. FIG. 2 is a cross-sectional view taken along line II-II of FIG. 1. This embodiment takes a liquid crystal device of a TFT active matrix drive system with a built-in driving circuit as an example of the electrooptic device.

In FIGS. 1 and 2, the liquid crystal device 1 has a TFT array substrate 10 and a counter substrate 20 opposed to each other and a liquid crystal layer 50 sealed between the TFT array substrate 10 and the counter substrate 20. The TFT array substrate 10 and the counter substrate 20 are bonded together by a sealing material 52 disposed in the sealing area around an image display area 10a which is a pixel area in which a plurality of pixels is provided.

The sealing material 52 is made of, for example, ultraviolet cure resin or thermosetting resin, for bonding the substrates together. The sealing material 52 is applied on the TFT array substrate 10 and then cured by ultraviolet or heat during manufacturing process. The sealing material 52 contains scattered gap materials such as glass fibers or glass beads for providing a specified space (inter-substrate gap) between the TFT array substrate 10 and the counter substrate 20. Thus, the electrooptic device of the embodiment is compact and suitable for enlarged display as the light valve of a projector.

A frame light-shielding film 53 that defines the frame area of the image display area 10a is disposed on the counter substrate 20 in parallel to the sealing area in which the sealing material 52 is disposed. Alternatively, part or the whole of the frame light-shielding film 53 may be built in the TFT array substrate 10. Around the image display area 10a is provided a peripheral area. In other words, in this embodiment, the portion of the liquid crystal device 1 away from the frame light-shielding film 53 with respect to the center of the TFT array substrate 10 is defined as a peripheral area.

The portion of the peripheral area outside the sealing area an which the sealing material 52 is disposed has a data-line driving circuit 101 and external-circuit-connecting terminals 102 along one side of the TFT array substrate 10. Scanning-line driving circuits 104 are provided along two sides adjacent to the one side in such a manner that they are covered with the frame light-shielding film 53. A plurality of wires 105 is provided along the remaining side of the TFT array substrate 10 to connect the two scanning-line driving circuits 104 provided on both sides of the image display area 10a in such a manner as to be covered with the frame light-shielding film 53.

The counter substrate 20 has vertical conducting materials 106 for vertical conduction of electricity between the substrates at the four corners. On the other hand, the TFT array substrate 10 has vertical conducting terminals at the portions corresponding to the corners. This allows electrical conduction between the TFT array substrate 10 and the counter substrate 20.

Referring to FIG. 2, the TFT array substrate 10 has thereon pixel electrodes 9a having TFTs serving as pixel switching elements, scanning lines, and data lines, and an alignment layer formed thereon. The counter substrate 20 has thereon a counter electrode 21, a lattice or stripe light-shielding layer 23, and an alignment layer at the uppermost layer. The liquid crystal layer 50 which is an example of the "electrooptic material" according to the first aspect of the invention is made of one kind or a mixture of several kinds of nematic liquid crystal, and has a predetermined orientation between the pair of alignment layers.

The TFT array substrate 10 is a transparent substrate made of quartz or glass or a semiconductor substrate made of silicon. The counter substrate 20 is also transparent as is the TFT array substrate 10.

The TFT array substrate 10 has the pixel electrodes 9a, on which an alignment layer subjected to a specified alignment process such as rubbing. For example, the pixel electrodes 9a are made of transparent conducting film such as indium tin oxide (ITO), while the alignment layer is made of organic film such as polyimide. The alignment layer may be an inorganic alignment layer formed by oblique vapor deposition.

The counter substrate 20 has the counter electrode 21 all over the surface and an alignment layer 22 thereunder. The counter electrode 21 is made of transparent conducting film such as ITO. The alignment layer 22 is made of the same material and by the same method as the alignment layer 16.

The counter substrate 20 may have a lattice or stripe light-shielding layer. This structure allows the semiconductor elements including the TFTs on the TFT array substrate 10 to be shielded from light.

There is the liquid crystal layer 50 between the TFT array substrate 10 and the counter substrate 20 opposed so that the pixel electrodes 9a and the counter electrode 21 face. The liquid crystal layer 50 is aligned in a specified orientation by the alignment layer, with no electric field applied from the pixel electrodes 9a.

The TFT array substrate 10 shown in FIGS. 1 and 2 may further have thereon, a sampling circuit for sampling the image signals on the image signal line and applying them to the data lines, a precharge circuit for applying precharge signals of a specified voltage level to the data lines prior to the image signals, and an inspection circuit for inspecting the quality and defect of the electrooptic device during manufacture or at shipment in addition to the driving circuits including the data-line driving circuit 101 and the scanning-line driving circuit 104.

1-2. Structure of Electrical Connection of Pixel Area

Figure 3:
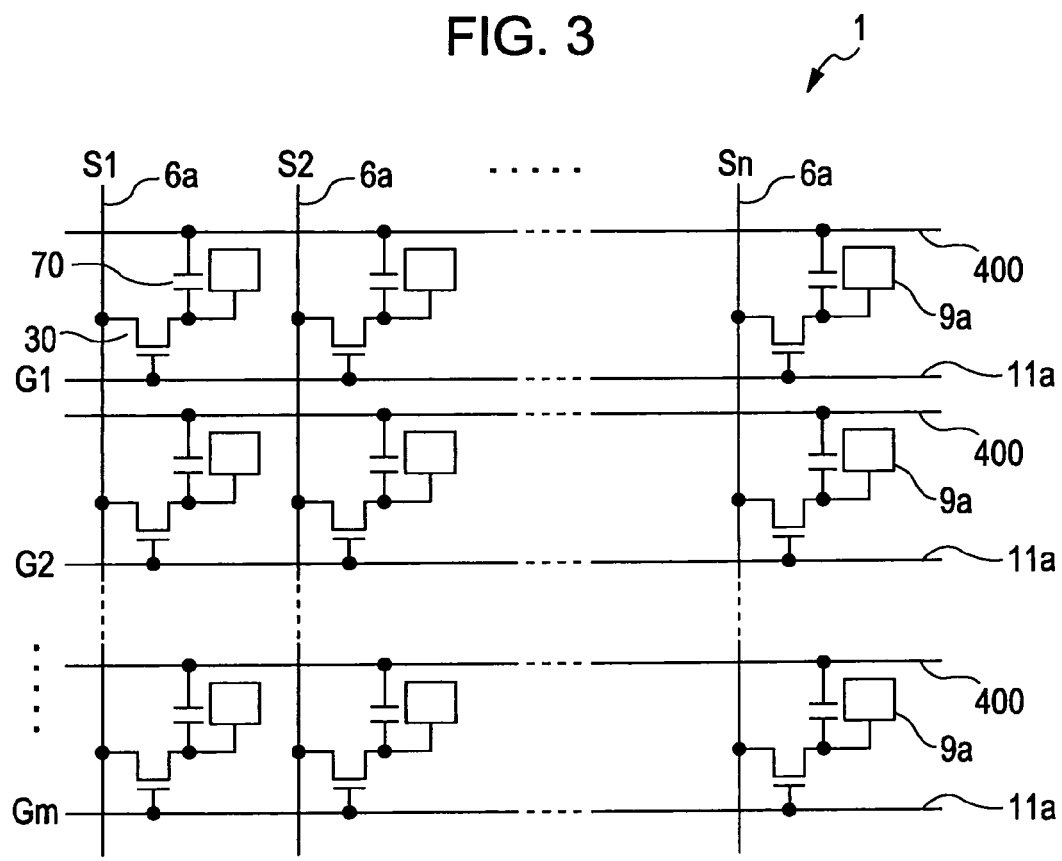
FIG. 3 is a diagram of an equivalent circuit of various elements and wires of a plurality of pixels that constitutes the image display area of the electrooptic device according to the first embodiment of the invention.

Referring next to FIG. 3, the electrical connection of the pixel area of the liquid crystal device 1 will be described in detail. FIG. 3 shows an equivalent circuit of various elements and wires of a plurality of pixels in matrix form that constitutes the image display area of the liquid crystal device 1.

In FIG. 3, the pixels in matrix form that constitute the image display area of the liquid crystal device 1 each have the pixel electrode 9a and a TFT 30. The TFT 30 is electrically connected to the pixel electrode 9a, and controls the switching of the pixel electrode 9a at the driving of the liquid crystal device 1. Data lines 6a to which image signals are applied are each electrically connected to the source of the TFT 30. Image signals S1 to Sn written to the data lines 6a may either be applied in that order in line sequence or be applied to adjacent data lines 6a group by group.

Scanning lines 11a are each electrically connected to the gate of the TFT 30. The liquid crystal device 1 applies pulsed scanning signals G1 to Gm in that order in line sequence to the scanning lines 11a at a specified timing. The pixel electrodes 9a are each electrically connected to the drain of the TFT 30. When the TFT 30 serving as a switching element is closed for a predetermined time, the image signals S1 to Sn applied through the data line 6a are written at a specified timing. The image signals S1 to Sn with a predetermined level written via the pixel electrode 9a are held for a predetermined period between it and the counter electrode 21 formed on the counter substrate 20.

The liquid crystal in the liquid crystal layer 50 changes in the orientations and order of the molecules according to the level of the applied voltage to modulate the light, allowing assigning intensity levels. In normally white mode, the transmittance of incident light decreases with the voltage applied to each pixel, while in normally black mode, the transmittance of incident light increases with the voltage applied to each pixel, and thus, light of a contrast corresponding to the image signals is emitted from the liquid crystal device. To prevent the held image signals from leaking, a storage capacitor 70 is provided in parallel to the liquid-crystal capacitor formed between the pixel electrode 9a and the counter electrode 21. This improves the potential holding characteristic of the pixel electrode 9a, thereby improving display characteristics such as contrast and flicker.

1-3. Concrete Structure of Electrooptic Device

Figure 4:
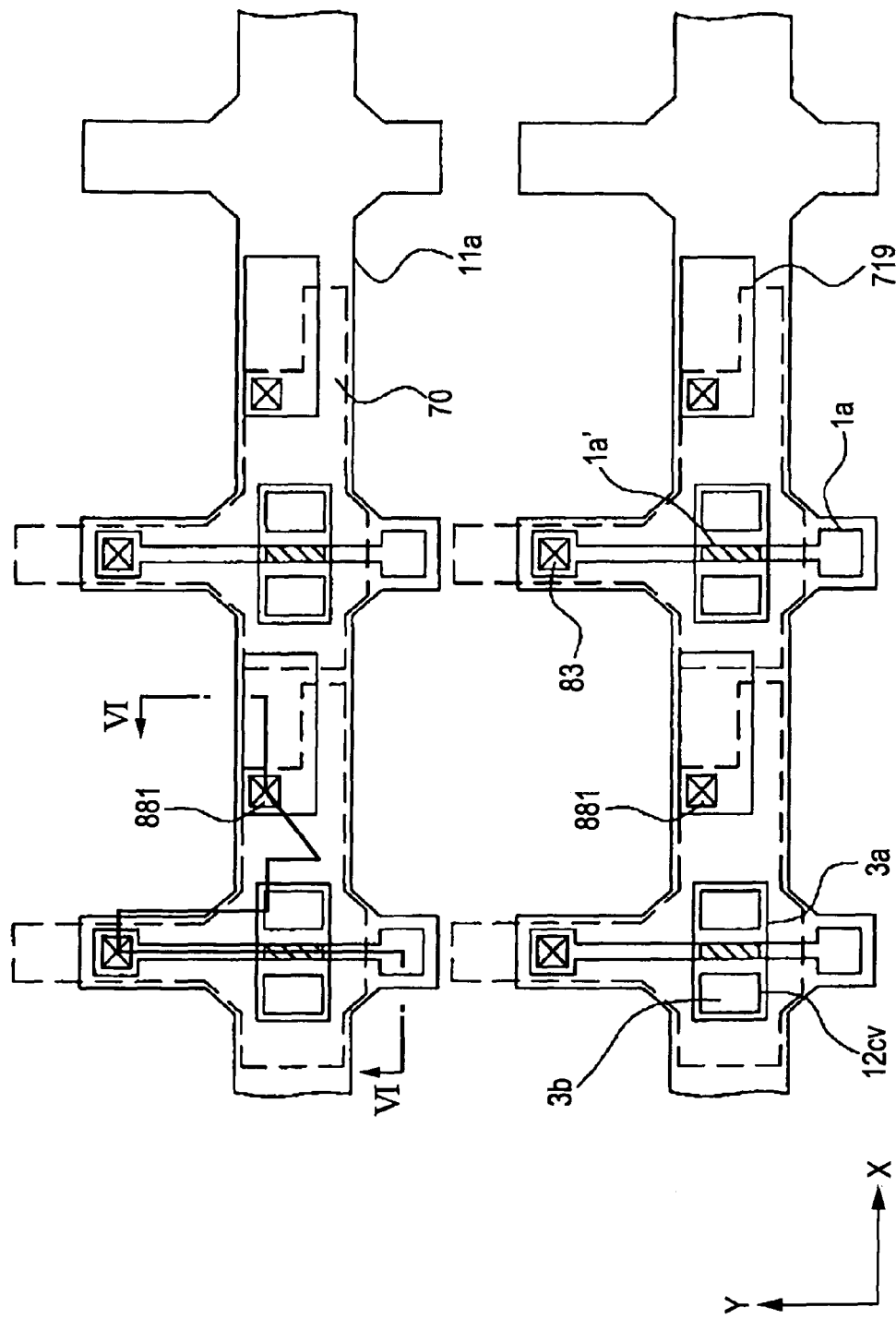
FIG. 4 is a fragmentary plan view (part 1) of the electrooptic device shown in FIG. 1, showing the concrete structure thereof.
Figure 5:
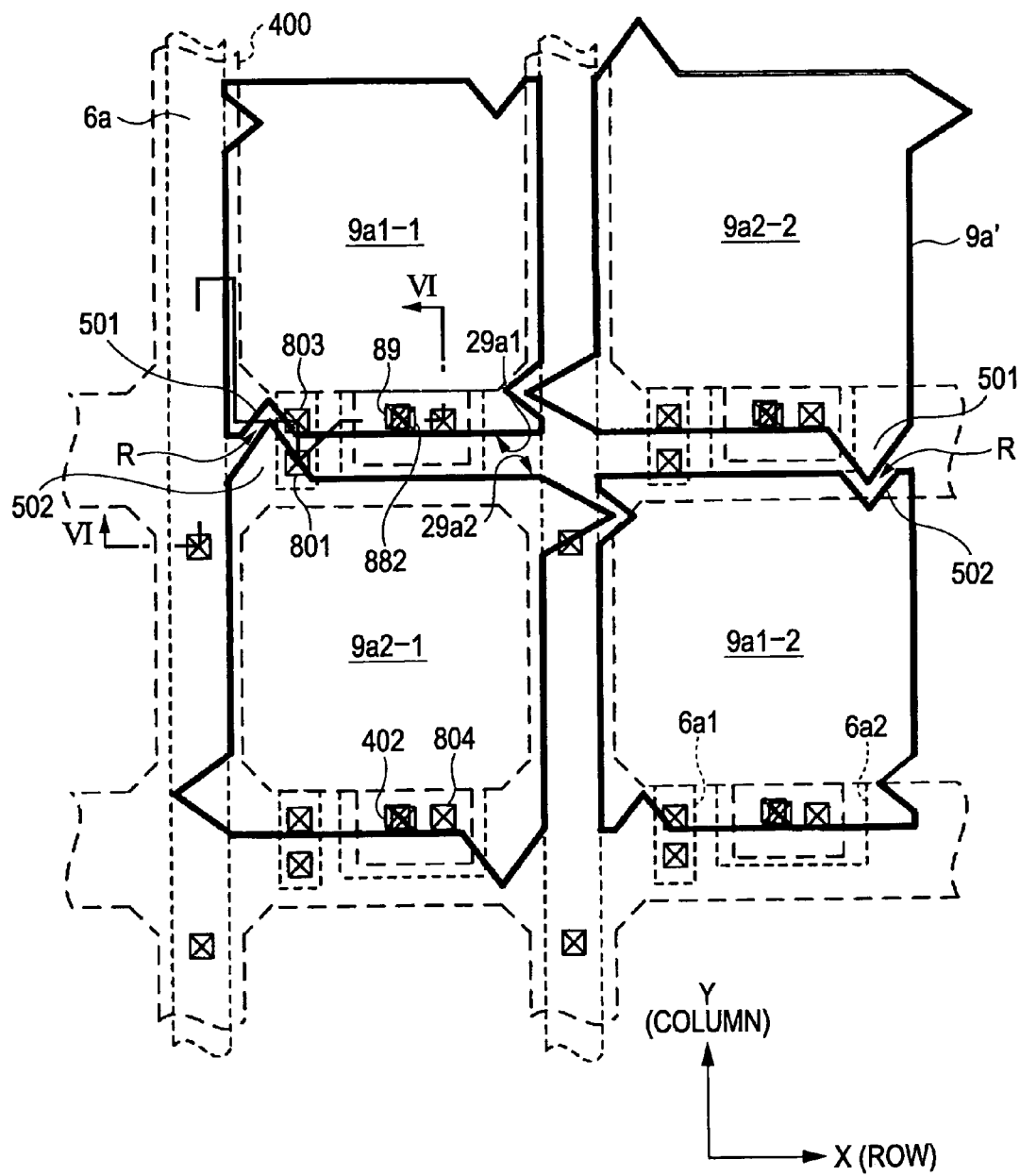
FIG. 5 is a fragmentary plan view (part 2) of the electrooptic device shown in FIG. 1, showing the concrete structure thereof.
Figure 6:
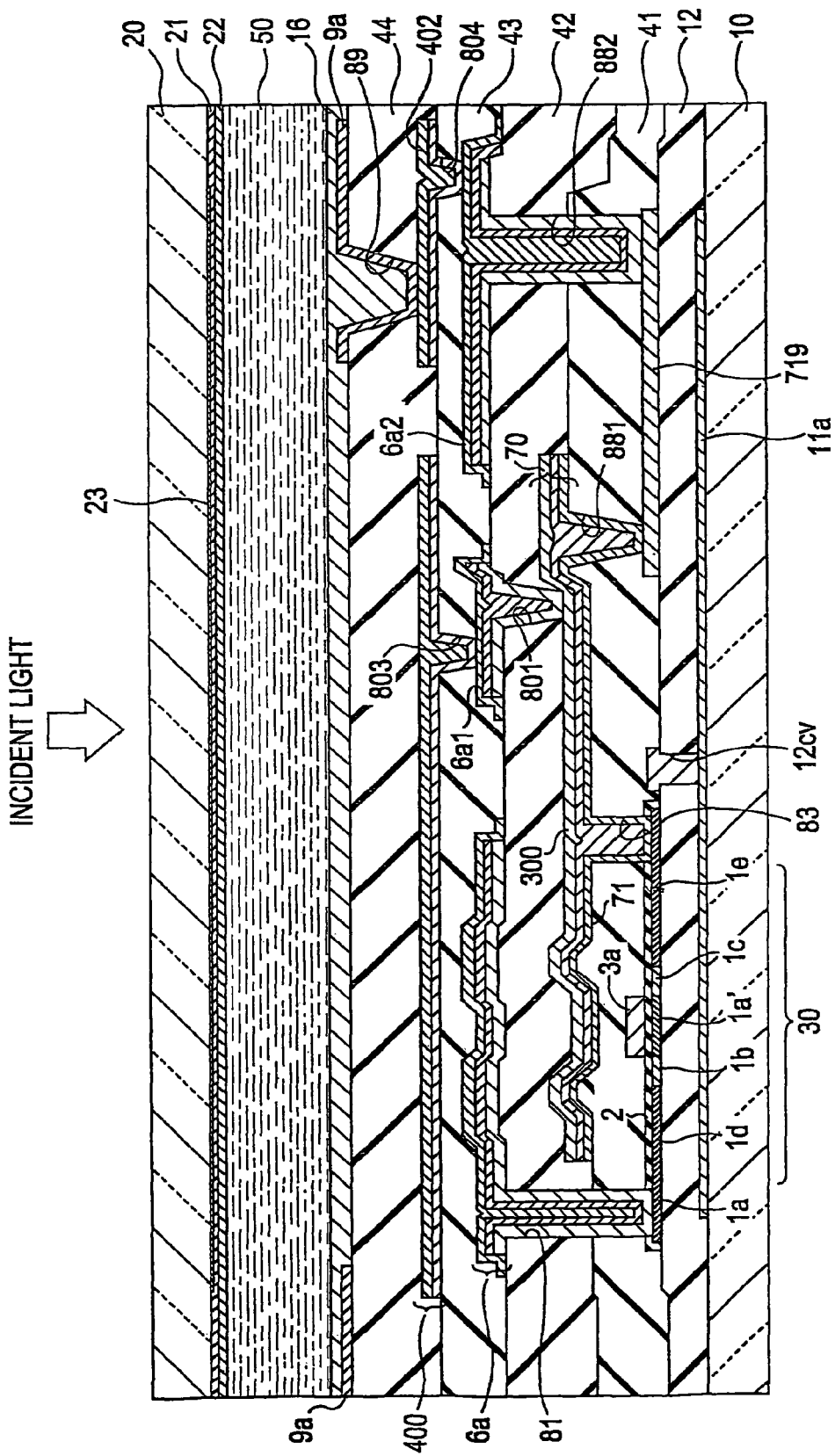
FIG. 6 is a cross-sectional view taken along line VI-VI of FIGS. 4 and 5.

Referring next to FIGS. 4 to 6, the concrete structure of the liquid crystal device 1 that performs the above operation will be described.

In FIGS. 4 to 6, the circuit elements and the pixel electrodes 9a are formed on the TFT array substrate 10. The TFT array substrate 10 is made of glass, quartz, silicon-on-insulator (SOI), or semiconductor, and is opposed to the counter substrate 20 made of glass or quartz. The circuit elements are for driving the pixel electrodes 9a, which here indicate the scanning lines 11a to a fourth insulating layer 44 layered in the range from directly on the TFT array substrate 10 to directly under the pixel electrodes 9a (see FIG. 6). The pixel electrodes 9a (outlined by the bold lines 9a in FIG. 5) are disposed in the pixel area in matrix form, along the boundary of which the data lines 6a and the scanning lines 11a are arranged in lattice form (see FIGS. 4 and 5).

The patterned conducting layer that constitutes the circuit elements includes a first layer having the scanning lines 11a, a second layer having gate electrodes 3a, a third layer having the fixed-potential-side capacitor electrodes of the storage capacitors 70, a fourth layer having the data lines 6a, and a fifth layer having capacitor lines 400 from the bottom. There is a base insulating layer 19 between the first layer and the second layer, a first interlayer insulating layer 41 between the second layer and the third layer, a second interlayer insulating layer 42 between the third layer and the fourth layer, a third interlayer insulating layer 43 between the fourth layer and fifth layer, and a fourth interlayer insulating layer 44 between the fifth layer and the pixel electrodes 9a, to prevent the short circuit between the elements. Among them, the first to third layers are shown as lower layers in FIG. 4, and the fourth and fifth layers and the pixel electrodes 9a are shown as upper layers in FIG. 5.

Structure of First Layer—Scanning Lines etc.

The first layer includes the scanning lines 11a. The scanning lines 11a are patterned in the shape including main lines extending in the X direction of FIG. 4 and protrusions extending in the Y direction of FIG. 4 in which the data lines 6a and the capacitor lines 400 extend. The scanning lines 11a are, e.g., made of conductive polysilicon, or alternatively, a simple metal containing at least one of high melting metals including titanium, chromium, tungsten, tantalum, and molybdenum, alloy, metal silicide, polysilicide, or a laminate thereof.

Structure of Second Layer—TFTs etc.

The second layer includes the TFTs 30 and relay electrodes 719. The TFTs 30 each have a lightly doped drain (LDD) structure which has a gate electrode 3a, a semiconductor layer 1a, and an insulating layer 2 containing a gate insulating layer for insulating the gate electrode 3a and the semiconductor layer 1a from each other. The gate electrode 3a is made of, for example, conductive polysilicon. The semiconductor layer 1a includes a channel region 1a', a low-density source region 1b and a low-density drain region 1c, and a high-density source region 1d and a high-density drain region 1e. The TFT 30 preferably has the LDD structure, although it may have an offset structure in which no impurities are implanted in the low-density source region 1b and the low-density drain region 1c, or alternatively, may adopt self alignment in which impurities are implanted at high density using the gate electrode 3a as the mask to form a high-density source region and a high-density drain region. The relay electrodes 719 are formed on the same layer as the gate electrodes 3a.

The gate electrode 3a of the TFT 30 is electrically connected to the scanning line 11a via a contact hole 12cv formed in the base insulating layer 12. The base insulating layer 12 is made of silicon oxide film or the like, and has the function of insulating the first layer and the second layer from each other and the function of preventing changes in characteristics of the TFT 30 due to the roughness of the substrate surface caused by polishing or the stains since it is formed all over the TFT array substrate 10.

Structure of Third Layer—Storage Capacitor etc.

The third layer includes the storage capacitors 70. The storage capacitors 70 each have a structure in which a capacitor electrode 300 and a lower electrode 71 are opposed with a dielectric layer therebetween. The capacitor electrode 300 is electrically connected to the capacitor line 400. The lower electrode 71 is electrically connected to the high-density drain region 1e of the TFT 30 and the pixel electrode 9a.

Specifically, the lower electrode 71 and the high-density drain region 1e are connected together via a contact hole 83 opened in the first interlayer insulating layer 41. The lower electrode 71 and the pixel electrode 9a are connected together at a contact hole 89 via contact holes 881, 882, and 804 and a relay electrode 719, a second relay electrode 6a2, and a third relay electrode 402.

The capacitor electrode 300 and the lower electrode 71 are made of, for example, conductive polysilicon, and the dielectric layer is made of silicon oxide. The first interlayer insulating layer 41 is made of, e.g., nonsilicate glass (NSG). Alternatively, the first interlayer insulating layer 41 may be made of silicate glass such as phosphorous silicate glass (PSG), boron silicate glass (BSG), or boron phosphorous silicate glass (BPSG), silicon nitride or silicon oxide.

The storage capacitor 70 is this case has a relatively high pixel open area ratio because so as not to reach a pixel area in which the pixel electrode 9a is formed (so as to be within the light-shielding area), as shown in the plan view of FIG. 4.

Structure of Fourth Layer—Data Lines etc.

The fourth layer includes the data lines 6a. The data line 6a is formed in three layers of aluminum, titanium nitride, and silicon nitride from the bottom. The silicon nitride layer is patterned in a relatively large size so as to cover the underlying aluminum layer and titanium nitride layer thereof. The fourth layer also has capacitor-line relay layers 6a1 and second relay electrodes 6a2 in the same layer as the data lines 6a. These are separate from each other as shown in FIG. 5.

The data line 6a is electrically connected to the high-density source region 1d of the TFT 30 via a contact hole 81 passing through the first interlayer insulating layer 41 and the second interlayer insulating layer 42.

The capacitor-line relay layer 6a1 is electrically connected to the capacitor electrode 300 via a contact hole 801 opened in the second interlayer insulating layer 42 to relay the capacitor electrode 300 and the capacitor line 400. The second relay electrode 6a2 is electrically connected to the relay electrode 719 via the contact hole 882 passing through the first interlayer insulating layer 41 and the second interlayer insulating layer 42, as described above The second interlayer insulating layer 42 can be formed of silicate glass such as NSG, PSG, BSG, or BPSG, silicon nitride, or silicon oxide.

Structure of Fifth Layer—Capacitor Lines etc.

The fifth layer includes the capacitor line 400 and the third relay electrodes 402. The capacitor line 400 extends to the periphery of the image display area of the display panel, and is electrically connected to a constant potential source to have a constant potential. As shown in FIG. 5, the capacitor line 400 has a lattice shape extending in the X direction and the Y direction. The part extending in the X direction is cut off to form an area for the third relay electrode 402. The capacitor line 400 is formed wider than the underlying circuit elements including the data line 6a, the scanning line 11a, and the TFT 30 so as to cover them. Thus, the circuit elements are shielded from light, thereby preventing bad influences such as reflecting incident light to cause blurring of the outline of the pixels of the projected image.

Furthermore, the corners of the capacitor line 400 at which the portion extending in the X direction and the portion extending in the Y direction intersect protrude slightly in the shape of a rough triangle. The protrusions can effectively shield the semiconductor layer 1a of the TFT 30 from light. That is, the protrusions reflect or absorb the light which comes at an angle to the semiconductor layer 1a from above to thereby reduce generation of light leak current at the TFT 30, allowing high-quality images without flickering to be displayed.

The capacitor line 400 is electrically connected to the capacitor-line relay layer 6a1 via a contact hole 803 opened in the third interlayer insulating layer 43. The fourth layer has the third relay electrode 402 in the same layer as the capacitor line 400. The third relay electrode 402 relays the second relay electrode 6a2 and the pixel electrode 9a via the contact holes 804 and 89, as described above. The capacitor line 400 and the third relay electrode 402 have a two-layer structure of, for example, aluminum and titanium nitride.

The fourth interlayer insulating layer 44 is formed all aver the fourth layer. The fourth interlayer insulating layer 44 has a contact hole 89 for electrically connecting the pixel electrode 9a and the third relay electrode 402 together.

1-4. Plan View of Pixel Electrode

Referring to FIG. 5, the effects of reducing the transverse electric field generated between the pixel electrodes 9a when the liquid crystal device 1 is driven will be described with reference to a plan view of the pixel electrode 9a. This embodiment takes four adjacent pixel electrodes of the pixel electrode 9a by way of example for ease of description.

In FIG. 5, of the plurality of pixel electrodes 9a, a pixel electrode 9a1-1 at the upper left and a pixel electrode 9a1-2 at the lower right correspond to "a first pixel electrode" according to the first aspect of the invention; and a pixel electrode 9a-1 at the lower left and a pixel electrode 9a2-2 at the upper right correspond to "a second pixel electrode" according to the First aspect of the invention. Here, we focus attention to the pixel electrodes 9a1-1 and 9a2-1. As will be described later in detail, the pixel electrodes 9a1-i and 9a2-1 are given potentials of different polarities with reference to a potential applied to the counter electrode 21 when the liquid crystal device 1 is driven.

The pixel, electrode 9a1-1 is substantially rectangular in outer shape. Of the four edges, a first edge 29a1 facing the pixel electrode 9a2-1 extends in the X direction, and has a recess 501 at a part. The pixel electrode 9a2-1 is substantially rectangular in outer shape as is the pixel electrode 9a1-1. Of the four edges, a second edge 29a2 facing the pixel electrode 9a1-1 extends in the X direction, and has a protrusion 502 at a part. The protrusion 502 protrudes from the second edge 29a2 to the first edge 29a1 so as to overlap with the region R defined by the recess 501.

Thus, the first edge 29a1 and the second edge 29a2 opposed at a space therebetween have the recess 501 and the protrusion 502, respectively, which are irregularities different from the first edge 29a1 and the second edge 29a2 extending in the X direction. The presence of the recess 501 and the protrusion 502 disturb the intensity distribution of the electric field caused by the potential difference between the pixel electrodes 9a1-1 and 9a2-1 in such a manner as to partially cut it in the X direction when the liquid crystal device 1 is driven, making the electric-field intensity distribution non-uniform to reduce the transverse electric field generated between the pixel electrodes 9a1-1 and 9a2-1.

The recess 501 and the protrusion 502 may be either the same in plan view, as in this embodiment, or different. Particularly, when the recess 501 and the protrusion 502 are the same in plan view, as in this embodiment, the pixel electrodes 9a-1 and 9a2-1 can be patterned more easily than the case of a recess and a protrusion of different shapes. In addition, the interval between the recess 501 and the protrusion 502 can be set easily. That is, the pixel electrodes 9a1-1 and 9a2-1 can be formed as large as possible and such that the recess 501 and the protrusion 502 are not in contact with each other. This prevents a decrease in contrast without a decrease in open air ratio caused by a large interval between pixel electrodes.

Even if the recess 501 and the protrusion 502 are different in size, the transverse electric field generated between the pixel electrodes 9a1-1 and 9a2-1 can be reduced provided that the protrusion 502 overlaps with the area defined by the recess 501. In addition, the effect of reducing the transverse electric field can be offered by the recess 501 and the protrusion 502 provided in any of the center and the ends of the edges of the pixel electrodes along the X direction, provided that the protrusion 502 overlaps with the area defined by the recess 501.

With the liquid crystal device 1 according to this embodiment, the first edge 29$a$1 and the second edge 29$a$2 may have a recess and a protrusion at least at part so as to make the electric-field intensity distribution between the pixel electrodes 9$a$1-1 and 9$a$2-1 nonuniform. Therefore, a decrease in open air ratio which may occur when the transverse electric field is reduced by increasing the distance between adjacent pixel electrodes can be reduced to a range in which the contrast of images is not substantially influenced.

Thus, the presence of the recess 501 and the protrusion 502 can reduce the transverse electric field to be generated between the adjacent pixel electrodes 9$a$1-1 and 9$a$2-1 as compared with a case without the recess 501 and the protrusion 502, that is, a case in which the first edge 29$a$1 and the second edge 29$a$2 extend in parallel in the X direction.

In this embodiment, the four edges of the pixel electrode 9$a$1-1 each have the recess 501, so that the transverse electric field to be generated between the pixel electrode 9$a$1-1 and the adjacent four pixel electrodes facing the four edges can be reduced. For the pixel electrodes 9$a$1-2, 9$a$2-1, and 9$a$2-2, the transverse electric field to be generated between them and the adjacent four pixel electrodes can be reduced.

1-5. Method for Driving Electrooptic Device

Figure 7A:
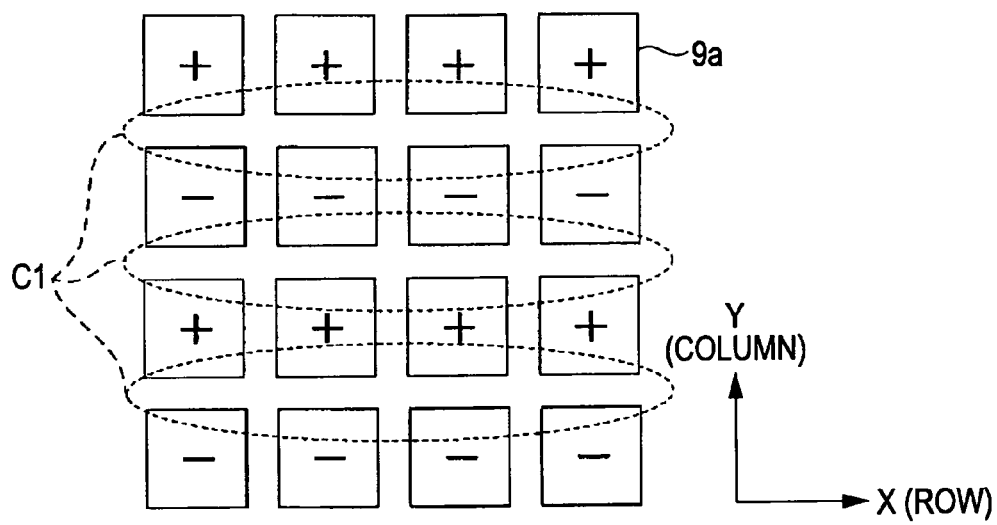
FIG. 7A is a conceptual diagram illustrating the operation of the electrooptic device according to the first embodiment of the invention by 1H inversion driving.
Figure 7B:
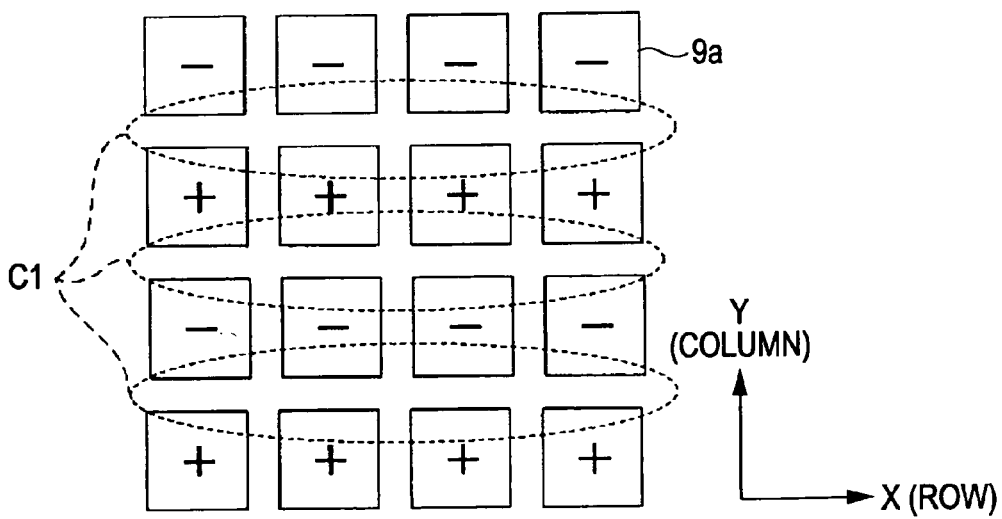
FIG. 7B is a conceptual diagram illustrating the operation of the electrooptic device according to the first embodiment of the invention by 1H inversion driving.

Referring to FIGS. 7A and 7B, an example of a method for driving the liquid crystal device 1 will be described. The embodiment employs 1H inversion driving to drive the liquid crystal device 1. FIGS. 7A and 7B illustrate the operation of the electrooptic device of the embodiment by the 1H inversion driving. FIGS. 7A and 7B show rectangular pixel electrodes in plan view for the convenience of illustration.

In FIGS. 7A and 7B, the plurality of pixel electrode 9$a$ arranged in the X direction and the Y direction are driven by application of voltages of opposite polarities with respect to a reference voltage, which are different from the polarity for the adjacent rows, to the pixel electrode 9$a$ arranged in parallel to the Y axis, while an image in the $n^{th}$ (in is a natural number) field or frame is being displayed, so that the pixel area is driven by liquid-crystal driving voltages of opposite polarities from row to row. This state is shown in FIG. 7A. During the image display period of the following $(n+1)^{th}$ field or frame, the polarity of the liquid-crystal driving voltage is inverted, as shown in FIG. 7B. From the $(n+2)^{th}$ field or frame on, the states shown in FIGS. 7A and 7B are repeated periodically. The periodic inversion of the polarity of voltage applied to the liquid crystal layer 50 prevents application of direct voltage to the liquid crystal, thereby preventing deterioration of the liquid crystal. Moreover, inverting the polarity of the voltage to be applied to the pixel electrode 9$a$ from row to row reduces crosstalk and flicker.

If the pixel electrodes 9$a$1 and 9$a$2 adjacent to each other in the Y direction (that is, belonging to different rows) have not the recess 501 and the protrusion 502, respectively, that is, if opposing edges of the pixel electrodes 9$a$1 and 9$a$2 extend in one direction, an electric field called a transverse electric field having a component parallel to the substrate surface is generated in the region C1 between the pixel electrodes 9$a$1 and 9$a$2 because the pixel electrodes 9$a$1 and 9$a$2 are driven by potentials of opposite polarities with respect to a reference voltage. In addition, the transverse electric field is generated also between the pixel electrodes 9$a$1 and 9$a$2 in different columns of the pixel electrodes 9$a$ in adjacent rows. Accordingly, when the liquid crystal device 1 is driven, the transverse electric field is generated all over the areas C1 along the scanning lines 11$a$. Thus, the transverse electric field obstructs limitation to the tilt angle of the liquid crystal molecules, causing afterimages and tailing when moving images are displayed.

Figure 8:
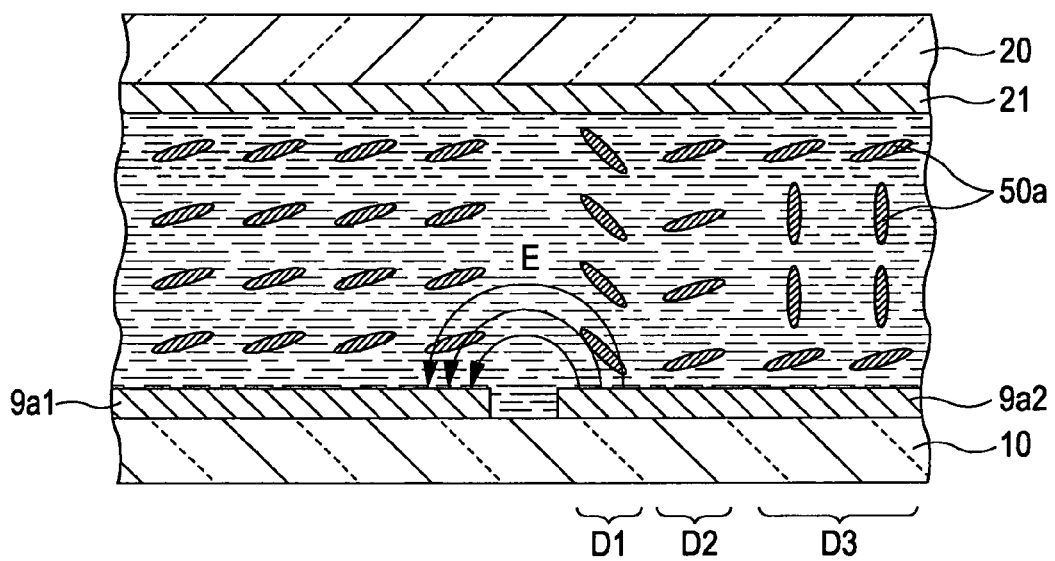
FIG. 8 is a conceptual diagram illustrating the orientation of liquid crystal according to a comparative example of the electrooptic device of the first embodiment of the invention.

More specifically, as shown in FIG. 8, when a driving voltage V is applied to the pixel electrode 9$a$2 of the adjacent pixel electrodes 9$a$1 and 9$a$2, while the pixel electrode 9$a$1 is not driven (for example, the potential of the pixel electrode 9$a$1 is the same as that of the counter electrode 21), a transverse electric field E caused by the potential difference of the pixel electrodes 9$a$1 and 9$a$2 is generated between the pixel electrodes 9$a$1 and 9$a$2. Such a transverse electric field E causes, between the driven pixel electrode 9$a$2 and the counter electrode 21, a region D3 in which the tilt angle of the liquid crystal 50$a$ is restricted to a desired angle, a region D1 in which reverse tilt is generated in the liquid crystal 50$a$ by the transverse electric field E, and a region D2 between the regions D1 and D3 in which the liquid crystal 50$a$ is restricted in tilt angle into unstable orientation according to the potential difference therebetween. The presence of the regions D1 and D2 may cause troubles in display such as afterimages and tailing when the liquid crystal device displays moving images.

The pixel electrodes 9$a$1 and 9$a$2 having a planar shape peculiar to the embodiment described with reference to FIG. 5 can reduce the transverse electric fields to be generated between adjacent pixel electrodes. In addition, the structure prevents a decrease in open are ratio caused by an increase in the space between the pixel electrodes.

A method for driving the electrooptic device of the invention is not limited to the method for driving the electrooptic device according to the embodiment. Another driving method such as dot inversion driving in which the polarities of pixel electrode are inverted from pixel to pixel can offer the effect of reducing the transverse electric field, provided that a transverse electric field may be generated between adjacent pixel electrodes.

As described above, the electrooptic device according to the embodiment can reduce a transverse electric field while preventing a decrease in open air ratio. Therefore, it can reduce troubles in display such as afterimages and tailing, while preventing a decrease in contrast due to a decrease in open air ratio.

Second Embodiment

Referring next to FIGS. 9 to 12, an electrooptic device according to a second embodiment will be described. Here, components common to the electrooptic device according to the first embodiment are not shown and described in detail. The electrooptic device of this embodiment has the same cross sectional structure as that shown in FIG. 6, and employs vertical-line inversion driving (1S inversion driving) in which image signals of different polarities (that is, polarities different from the potential of the counter electrode 21) are applied to adjacent data lines of the data lines 6$a$ which is an example of "an image signal line" according to the second aspect of the invention or dot inversion driving in which image signals of different polarities are applied to adjacent pixels.

2-1. Concrete Structure of Electrooptic Device

Figure 9:
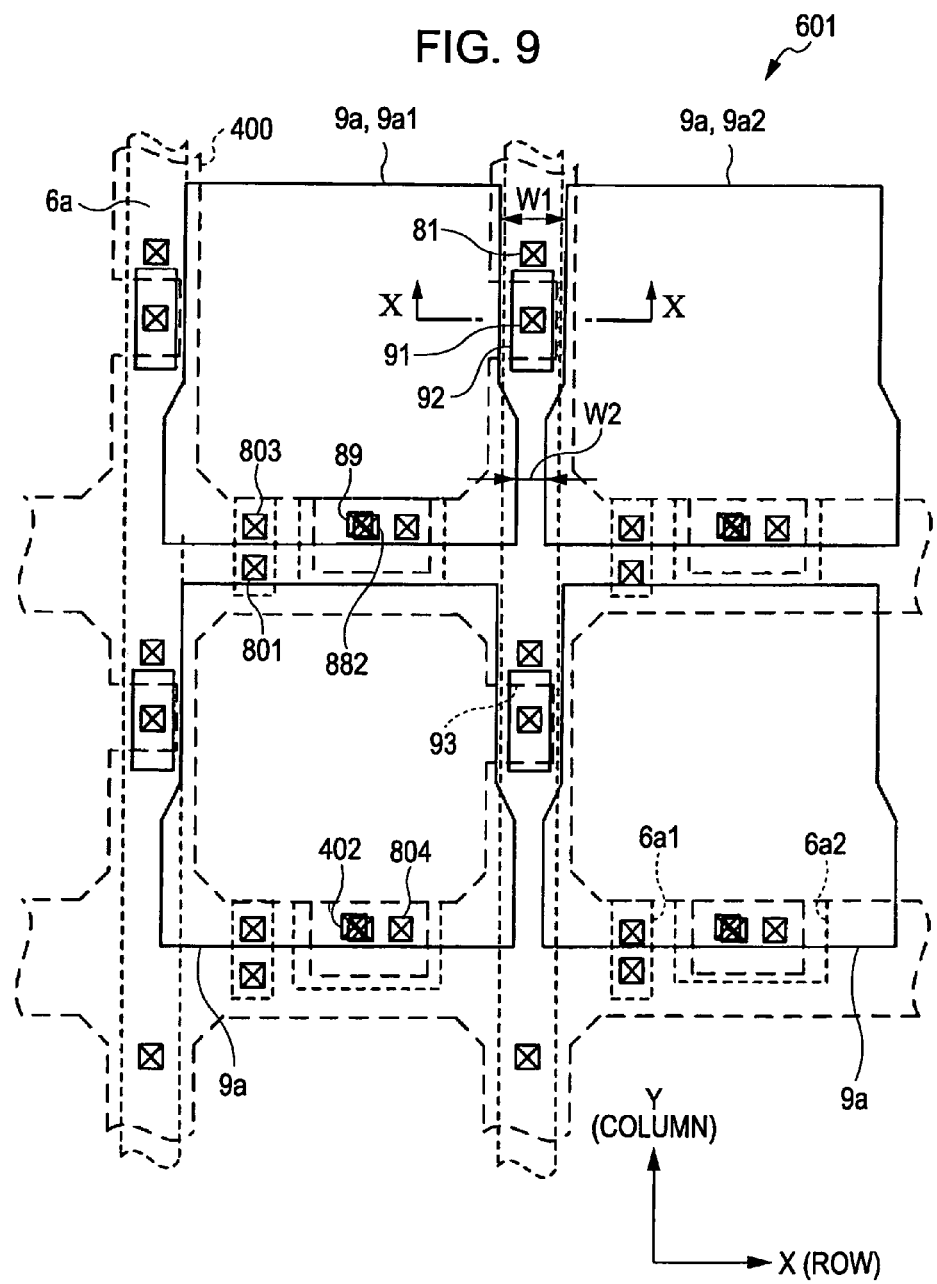
FIG. 9 is a fragmentary plan view of an electrooptic device according to a second embodiment of the invention, snowing the concrete structure thereof.
Figure 10:
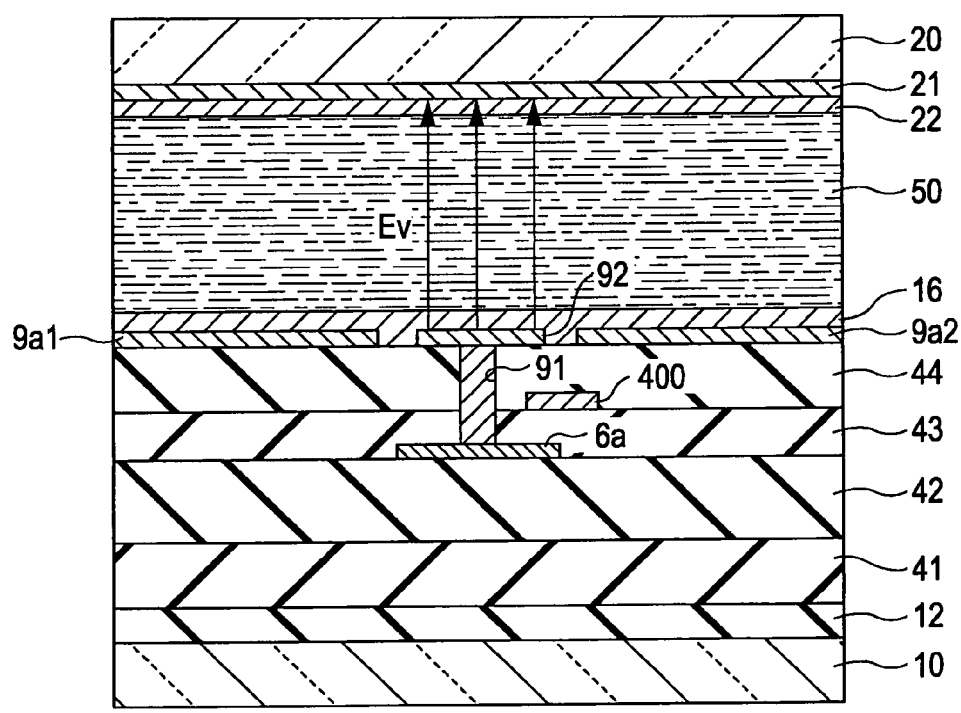
FIG. 10 is a cross-sectional view taken along line X-X of FIG. 9.

Referring to FIGS. 9 and 10, the concrete structure of a liquid crystal device 601, one example of the electrooptic device of the second embodiment, will be described.

Referring to FIGS. 9 and 10, the effect of reducing the transverse electric field generated between the adjacent pixel electrodes 9a during the driving of the liquid crystal device 601 will be described while a conducting layer 92 formed between adjacent pixel electrodes 9a is described. FIG. 10 is a cross sectional view of taken along line X-X of FIG. 9. This embodiment takes four adjacent pixel electrodes of all the pixel electrode 9a by way of example for ease of description.

In FIGS. 9 and 10, the liquid crystal device 601 includes pixel electrodes 9a1 and 9a2 adjacent to each other in the X direction and the conducting layer 92 extending between the pixel electrodes 9a1 and 9a2. The pixel electrodes 9a1 and 9a2 are an example of "a first pixel electrode" and "a second pixel electrode" according to the second aspect of the invention. As will be described in detail, the pixel electrodes 9a1 and 9a2 are supplied with potentials of different polarities with reference to a potential applied to the counter electrode 21 when the liquid crystal device 601 is driven.

The pixel electrodes 9a1 and 9a2 are substantially rectangular in outer shape and are adjacent to each other at an interval in the X direction. The width W1 of part of the region between the pixel electrodes 9a1 and 9a2 is larger than the width W2 of the other part of the region. The conducting layer 92 is formed in the same layer as the pixel electrodes 9a1 and 9a2 in such a manner that it overlaps with the wide region. Accordingly, even if the interval between the pixel electrodes 9a1 and 9a2 is set small to increase the contrast of the display image, a sufficient space for the conducting layer 92 can be provided on the base layer on which the pixel electrodes 9a1 and 9a2 are formed. In addition, the conducting layer 92 can be formed of ITO as is the pixel electrode 9a by the process common to the process of forming the pixel electrodes 9a. Therefore, the process of manufacturing the liquid crystal device 601 can be made simpler than a case in which the conducting layer 92 is formed by a process different form the process of forming the pixel electrodes 9a.

The conducting layer 92 is formed in islands so as to overlap with the region extending between the pixel electrodes 9a1 and 9a2. The conducting layer 92 is electrically connected to the data line 6a via a contact hole 91, an example of "a connecting portion" according to the second aspect of the invention. The contact hole 91 passes through the third interlayer insulating layer 43 and the fourth interlayer insulating layer 44 in the region defined by a cut-away portion 93 of the capacitor line 400. Thus, the contact hole 91 electrically connects the data line 6a and the conducting layer 92, while being electrically insulated from the capacitor line 400.

The conducting layer 92 is supplied with the potential of an image signal applied to the data line 6a when the liquid crystal device 601 is driven. The potential of the image signal is an example of "a first potential" according to the second aspect of the invention. The contact hole 91 is electrically connected to the portion of the data line 6a adjacent to an external circuit as viewed from the pixel electrodes 9a1 and 9a2. The potential of the conducting layer 92 electrically connected to the data line 6a is maintained at the potential of the image signal irrespective of the switching action of the pixel switching TFT 30 of each pixel, so that it is different from the potential of the pixel electrode 9a which is set according to the action of the pixel switching TFT 30.

The presence of the conducting layer 92 reduces the transverse electric field generated between the pixel electrodes 9a1 and 9a2 according to the difference in potential therebetween. More specifically, it can reduce the transverse electric field generated between the pixel electrodes 9a1 and 9a2 in such a manner as to partially cut the intensity distribution by the potential applied to the conducting layer 92.

Particularly, in this embodiment, the potential applied to the conducting layer 92 is different from the common potential LCC applied to the counter electrode 21 facing the conducting layer 92. When the liquid crystal device 601 is driven, a vertical electric field Ev is generated between the conducting layer 92 and the counter electrode 21, depending on a difference in potential between the conducting layer 92 and the counter electrode 21. The orientation of the liquid crystal between the pixel electrodes 9a1 and 9a2 is restricted by the vertical electric field Ev.

Accordingly, the liquid crystal whose orientation is restricted by the vertical electric field Ev can be decreased in display troubles caused by the relative orientation of the liquid crystal on the pixel electrodes 9a1 and 9a2. More specifically, the vertical electric field Ev can reduce the transverse electric field generated between the pixel electrodes 9a1 and 9a2, and the liquid crystal whose orientation is restricted by the vertical electric field Ev can prevent the relative influence of the defective orientation generated in the liquid crystal on the pixel electrodes 9a1 and 9a2 due to the transverse electric field. Thus, display troubles such as tailing and afterimages which may occur when moving images are displayed, and thus the display performance of the liquid crystal device 601 is improved.

The conducting layer 92 may not necessarily be formed in the same layer as the pixel electrode 9a provided that it overlaps with the region extending between the pixel electrodes 9a1 and 9a2. Particularly, in this embodiment, the conducting layer 92 is formed directly under the alignment layer 16 of the multilayer of the TFT array substrate 10. Thus, the distance between the counter electrode 21 and the conducting layer 92 is smaller than that of a case in which the conducting layer 92 is formed under the pixel electrode 9a. Accordingly, the intensity of the vertical electric field Ev generated between the conducting layer 92 and the counter electrode 21 is also relatively large according to the distance between the piano 21 and the conducting layer 92, so that the effect of reducing tailing and afterimages is enhanced.

In addition, the liquid crystal whose orientation is restricted by the vertical electric field EV is located in the unopen area between the pixel electrodes 9a1 and 9a2, that is, an area that does not contribute to displaying images, thus not decreasing the open air ratio of the pixels. This allows a decrease in open air ratio to be reduced in the range in which th contrast of images is not substantially influenced.

The conducting layer 92 is not necessarily be rectangular in plan view but may be circular, polygonal, or irregular.

With the electrooptic device of this embodiment, the transverse electric field can be reduced while a decrease in open air ratio is prevented. Accordingly, display troubles such as afterimages or tailing due to the transverse electric field can be reduced while a decrease in contrast due to a decrease in open air ratio is reduced.

2-2. Method for Driving Electrooptic Device

Figure 11A:
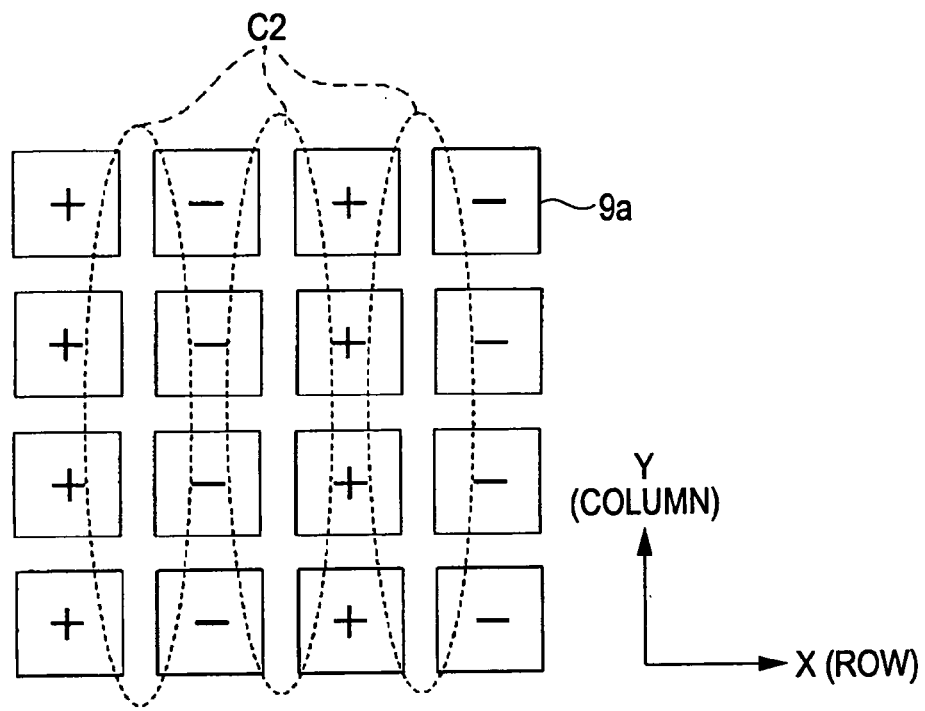
FIG. 11A is a conceptual diagram illustrating the operation of the electrooptic device according to the second embodiment of the invention by 1S inversion driving.
Figure 11B:
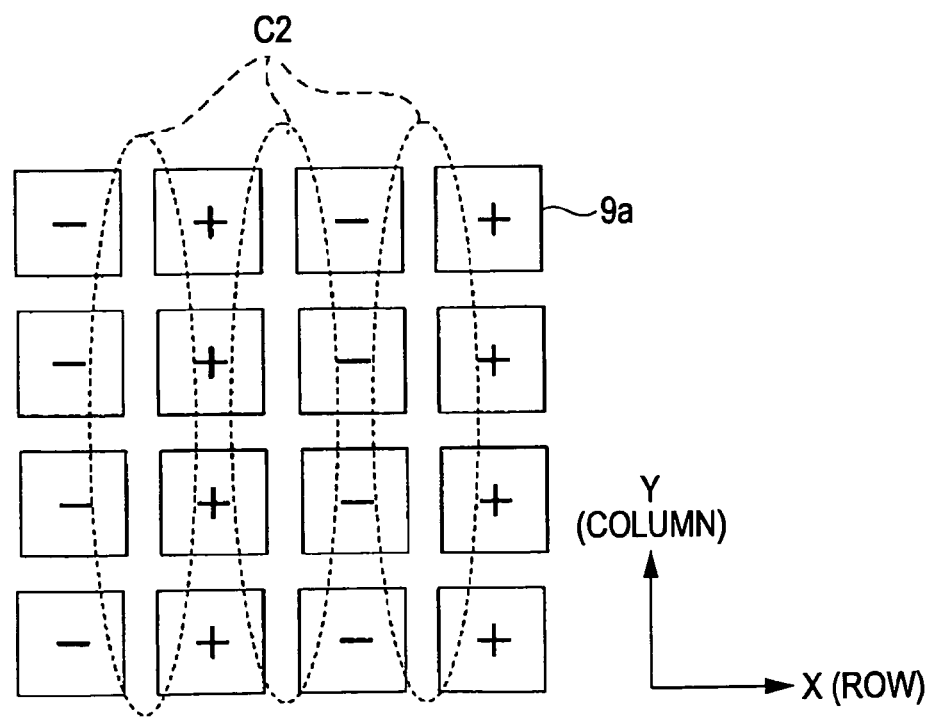
FIG. 11B is a conceptual diagram illustrating the operation of the electrooptic device according to the second embodiment of the invention by 1S inversion driving.

Referring to FIGS. 11A and 11B, an example of a method for driving the liquid crystal device 601 will be described. The embodiment employs 1S inversion driving to drive the liquid crystal device 601. FIGS. 11A and 11B illustrate the operation of the electrooptic device of the embodiment by the 1S inversion driving. FIGS. 11A and 11B show rectangular pixel electrodes in plan view for the convenience of illustration.

In FIGS. 11A and 11B, the plurality of pixel electrode 9a arranged in the X direction and the Y direction are driven by application of voltages of opposite polarities with respect to a reference voltage, which are different from the polarity for the adjacent columns, to the rows of the pixel electrode 9a arranged in parallel to the X axis while an image in the $n^{th}$ (n is a natural number) field or frame is being displayed, so that the pixel area is driven by liquid-crystal driving voltages of opposite polarities from column to column. This state is shown in FIG. 11A. During the image display period of the following $(n+1)^{th}$ field or frame, the polarity of the liquid-crystal driving voltage is inverted, as shown in FIG. 11B. From the $(n+2)^{th}$ field or frame on, the states shown in FIGS. 11A and 11B are repeated periodically. The periodic inversion of the polarity of voltage applied to the liquid crystal layer 50 prevents application of direct voltage to the liquid crystal, thereby preventing deterioration of the liquid crystal. Moreover, reversing the polarity of the voltage to be applied to the pixel electrode 9a from column to column reduces crosstalk and flicker.

Without the conducting layer 92 between the pixel electrodes 9a1 and 9a2 adjacent to each other in the X direction (that is, belonging to different columns), an electric field called a transverse electric field having a component parallel to the substrate surface is generated in the region C2 between the pixel electrodes 9a1 and 9a2 because the pixel electrodes 9a1 and 9a2 are driven by potentials of opposite polarities with respect to a reference voltage. In addition, the transverse electric field is generated also between the pixel electrodes 9a in different rows of the pixel electrode 9a in adjacent columns. Accordingly, when the liquid crystal device 601 is driven the transverse electric field is generated all over the areas C2 along the data lines 6a. Thus, the transverse electric field obstructs limitation to the tilt angle of the liquid crystal molecules, causing afterimages and tailing when moving images are displayed.

Figure 12:
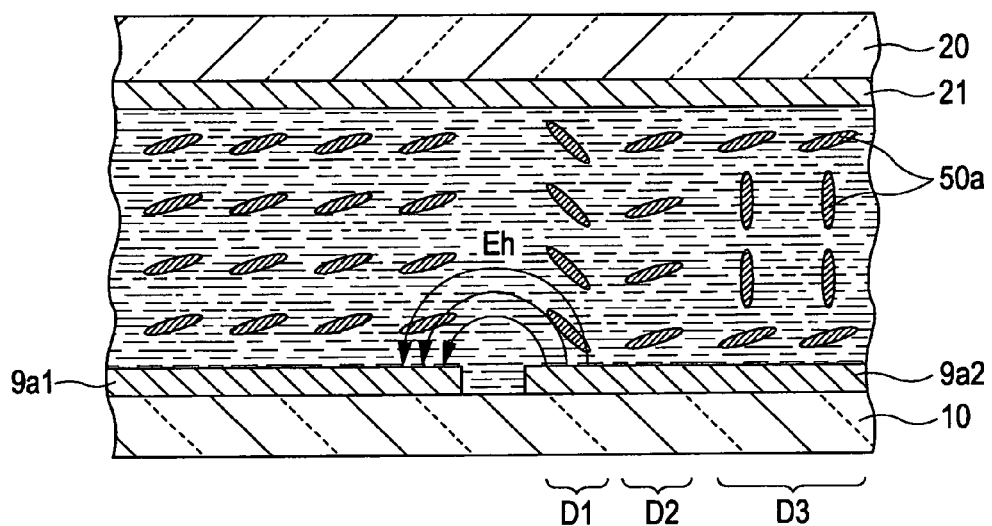
FIG. 12 is a conceptual diagram illustrating the orientation of liquid crystal according to a comparative example of the electrooptic device of the second embodiment of the invention.

More specifically, as shown in FIG. 12, when a driving voltage V is applied to the pixel electrode 9a2 of the adjacent pixel electrodes 9a1 and 9a2 is given a driving voltage V, while the pixel electrode 9a1 is not driven (for example, the potential of the pixel electrode 9a1 is the same as that of the counter electrode 21), a transverse electric field Eh caused by the potential difference of the pixel electrodes 9a1 and 9a2 is generated between the pixel electrodes 9a1 and 9a2. Such a transverse electric field Eh causes, between the driven pixel electrode 9a2 and the counter electrode 21, a region D3 in which the tile angle of the liquid crystal 50a is restricted to a desired angle, a region D1 in which reverse tilt is generated in the liquid crystal 50a by the transverse electric field Eh, and a region D2 between the regions D1 and D3 in which the liquid crystal 50a is restricted in tilt angle into unstable orientation according to the potential difference therebetween. The presence of the regions D1 and D2 may cause troubles in display such as afterimages and tailing when the liquid crystal device 601 displays moving images.

Thus, the structure peculiar to the electrooptic device according to the embodiment described with reference to FIGS. 9 and 10 reduces the transverse electric field generated between adjacent pixel electrodes. In addition, even if the regions D1 and D2 shown in FIG. 12 remain on the pixel electrodes, the regions D1 and D2 are connected together between adjacent pixels to prevent unstable orientation across a plurality of pixels. Thus, the electrooptic device according to this embodiment can remarkably decrease display troubles such as tailing which may occur when moving images are displayed. In addition, the electrooptic device according to this embodiment prevents a decrease in open are ratio caused by expansion of the space between the pixel electrodes.

A method for driving the electrooptic device according to the embodiment is not limited to the above-described driving method. Another driving method such as dot inversion driving in which the polarities of pixel electrode are inverted from pixel to pixel can offer the effect of reducing the transverse electric field, provided that a transverse electric field may be generated between adjacent pixel electrodes.

As described above, the electrooptic device according to the embodiment can reduce a transverse electric field while preventing a decrease in open air ratio. Therefore, it can reduce troubles in display such as afterimages and tailing, while preventing a decrease in contrast due to a decrease in open air ratio.

3. Electronic Device

Next, an electronic device incorporating the electrooptic device according to the first or second embodiment will be described.

Figure 13:
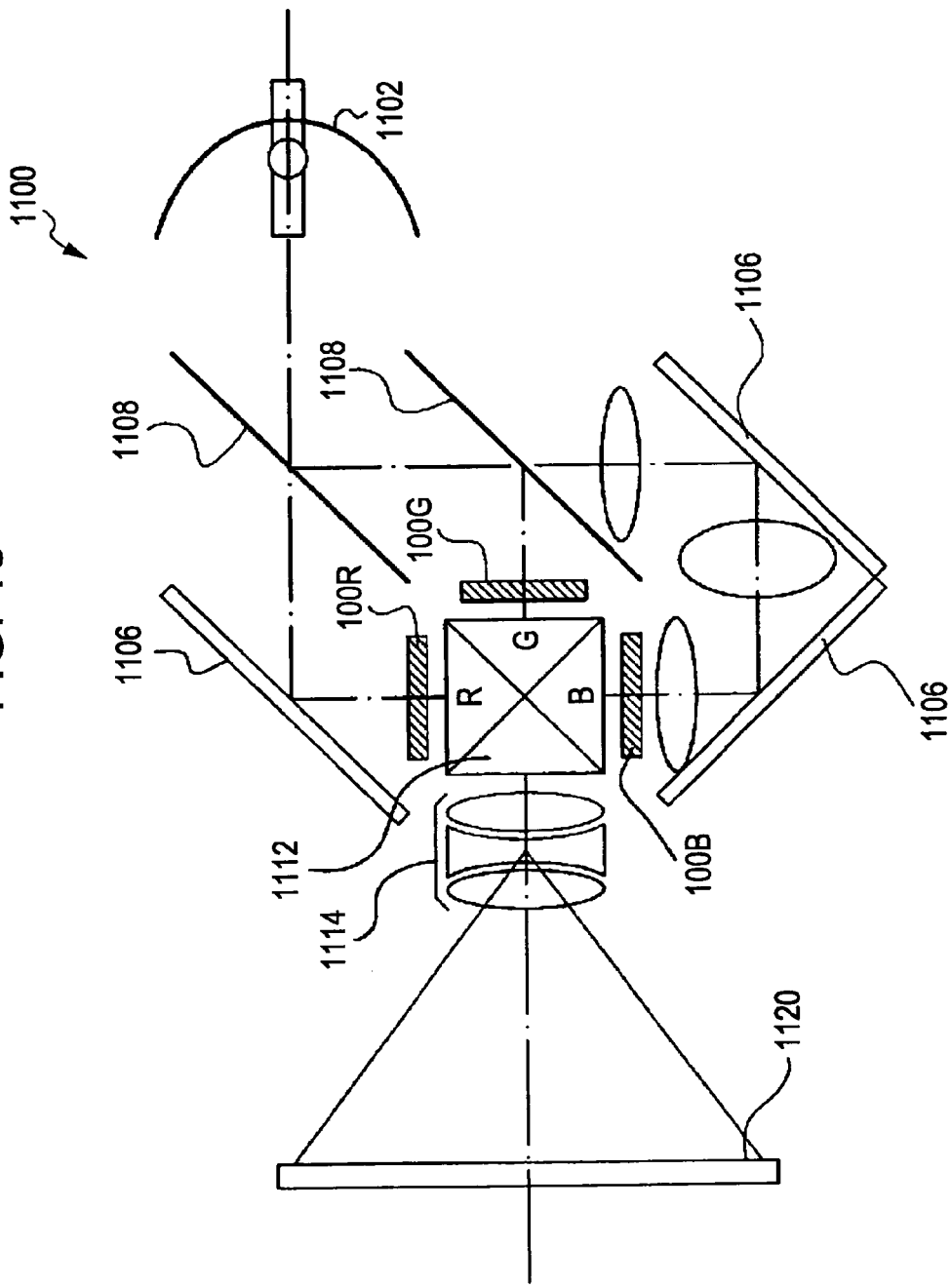
FIG. 13 is a plan view of a liquid crystal projector which is an electronic device according to an embodiment of the invention.

A projector that uses the liquid crystal device or the electrooptic device as a light valve will be described hereinbelow. FIG. 13 is a plan view of the projector denoted at 1100. As shown in FIG. 13, the projector 1100 accommodates a lamp unit 1102 including a white light source such as a halogen lamp. The light emitted from the lamp unit 1102 is separated into the three primary colors of RGB by four mirrors 1106 and two dichroic mirrors 1108 disposed in a light guide, and enters liquid crystal devices 100R, 100G, and 100B serving as light valves corresponding to the respective primary colors. The liquid crystal devices 100R, 100G, and 100B have the same structure as the above-described liquid crystal device, in which the primary-color signals of RGB applied from an image-signal processing circuit are modulated, respectively. The light modulated by the liquid crystal displays 100R, 100G, and 100B enter the dichroic prism 1112 from three directions. The dichroic prism 1112 refracts R and B lights at 90° and allows G light to go straight. The images of the colors are combined, and thus a color image is projected onto a screen 1120 through a protrusion lens 1114.

We have described a liquid crystal device as a concrete example of the electrooptic device according to embodiments of the invention, the electrooptic device according to embodiments of the invention can be embodied as electrophoresis devices such as electronic paper or displays using electron emitter elements (field-emission displays and surface-conduction electron-emitter displays). The electrooptic device according to embodiments of the invention can be applied not only to the above-described projector but also to various electronic devices such as TV receivers, viewfinder or monitor-direct-view type videotape recorders, car navigation systems, pagers, electronic notebooks, calculators, word processors, workstations, TV phones, POS terminals, and devices having a touch panel.

It is to be understood that the invention is not limited to the above-described embodiments and that various changes and modifications may be made without departing from the spirit and scope as set out in the accompanying claims and the specification; electrooptic devices modified and electronic devices having such electrooptic devices are also within the technical scope of the invention.

The entire disclosure of Japanese Patent Application Nos: 2006-277235, filed Oct. 11, 2006 and 2006-284689, filed Oct. 19, 2006 are expressly incorporated by reference herein.

What is claimed is:

1. An electrooptic device comprising:
   a plurality of image signal lines;
   a plurality of scanning lines arranged in an array with the plurality of image signal lines and intersecting with the plurality of image signal lines at locations corresponding to pixels;
   a first substrate and a second substrate;
   an electrooptic material sandwiched between the first and second substrates;

a first pixel electrode and a second pixel electrode located between the electrooptic material and the first substrate, the first pixel electrode and the second pixel electrode separated by a region extending between the first pixel electrode and the second pixel electrode, the first and second pixel electrodes being supplied with different potentials;

a conducting layer formed in an island shape on the first substrate, the conducting layer overlapping the region extending between the first pixel electrode and the second pixel electrode, and formed on the same layer as the first pixel electrode and the second pixel electrode; and a connecting portion that electrically connects an image signal line of the plurality of image signal lines and the conducting layer, and wherein the image signal line feeds image signals to the first pixel electrode and is formed on the first substrate and under the conducting layer.

2. The electrooptic device according to claim 1, further comprising:

a counter electrode formed on the second substrate and facing the first pixel electrode and the second pixel electrode.

3. The electrooptic device according to claim 2, wherein the respective potentials of the first pixel electrode and the second pixel electrode have different polarities with reference to the common potential.

4. The electrooptic device according to claim 1, wherein the first pixel electrode and the second pixel electrode are formed on the same layer in such a manner as to increase in the interval therebetween so that the width of part of the region is increased.

5. An electronic device comprising the electrooptic device according to claim 1.

6. The electrooptic device according to claim 1, wherein the electrooptic device further includes a pixel-switching TFT serving as a switching element for the first pixel electrode, and wherein the image signal line is electrically connected to a source of the TFT, the first pixel electrode is electrically connected to a drain of the TFT, and a scanning line of the plurality of scanning lines is electrically connected to a gate of the TFT.

7. The electrooptic device according to claim 1, wherein the image signal lines extend in a direction on the electrooptic device that is orthogonal to the scanning lines.

* * * * *